Patented Mar. 27, 1945

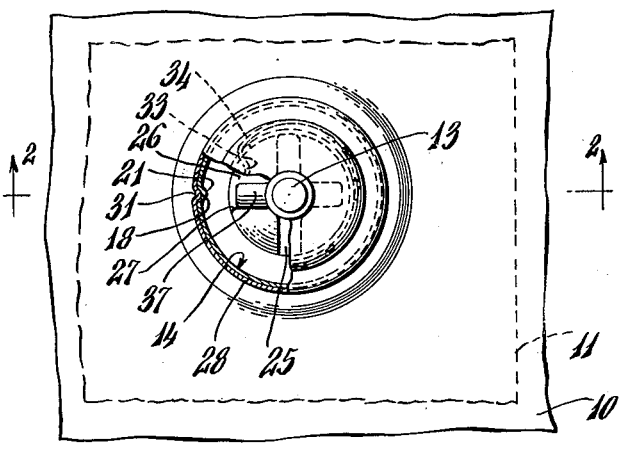

2,372,496

UNITED STATES PATENT OFFICE 2,372,496

COWL FASTENER

Otto J. Huelster, Waterbury, Conn., assignor to Scovill Manufacturing Company, Waterbury, Conn., a corporation of Connecticut Application December 1, 1942, Serial No. 467,526

14 Claims. (Cl. 24—221)

My present invention relates to fastening devices for releasably clamping and locking together two or more members—more particularly metal plates—in juxtaposed relation and, although susceptible of general application and use, it is primarily directed to such fastening devices which are intended for detachably securing aircraft cowling and inspection plates or covers in place.

This invention constitutes an improvement upon the invention described and claimed in the co-pending application of William H. Barlow, Serial No. 467,527, filed December 1, 1942, and owned by the assignee of the present invention.

One type of fastening device at present conventionally used for the specific purposes above stated consists of a stud having a cross-pin adapted to be passed through an opening in a cooperating locking member formed with cam surfaces over which the cross-pin is caused to ride by turning the stud and with detents or recesses at the high points of the cam into which the cross-pin is drawn and held by a tension coil-spring carried by the stud. The force with which the cross-pin can be held within the detents depends upon the axial tension of the coil-spring and this force is always less than the maximum tension of the spring because of a diminution thereof due to the movement of the cross-pin rearwardly from the high points of the cam into the detents. This loss in spring tension exerted on the cross-pin when in locked position renders the connection susceptible of separation under conditions of great stress and vibration, such as is encountered by the parts of an aeroplane when making a power dive or the like. Moreover, because of dimensional limitations on the fastening devices of this type and other factors, coil-springs having sufficient axial tension to absolutely prevent such disengagement of the cross-pin from the detents can not be used.

According to my present invention, I provide a fastening device which is especially well suited for the purposes set forth and in which detents or recesses in the cam member which permit of a reduction in effective axial tension on the cross-pin are eliminated, and in lieu thereof means are provided for insuring that the cross-pin will be held against accidental turning or disengagement while disposed on the high points of the cam. This I accomplish by the provision of dual spring means, one for holding the engaged cam and stud members of the fastening device under desired axial tension and one for preventing disengagement of the stud cross-pin from the high points on the cam. More specifically my invention differs from that disclosed in the aforementioned Barlow application in that the socket member instead of being formed from a single blank and permanently affixed to the supporting plate, is formed of a plurality of assembled elements which permit of the socket member being more compactly made and more easily attachable to the supporting member. The construction is also such that the socket member may be readily separated from the supporting member and be replaced by another socket member if need for such replacement arises. A further improvement over the Barlow construction resides in the fact that the stud cross-pin holding spring may be readily withdrawn and replaced should it break or otherwise become inoperative for its intended function.

The invention will be better understood from the detailed description which follows when considered in connection with the accompanying drawing showing a preferred embodiment, and wherein:

Figure 1 is a rear or top plan view, partly broken away, of the fastening device of my invention in applied relation of holding a cover plate in locked position.

Fig. 2 is a section taken substantially along the plane of the line 2—2 of Fig. 1.

Fig. 3 is a diametrical section through the housing member, substantially along the plane of the line 2—2 of Fig. 1.

Figs. 4 and 5 are side elevations with parts thereof broken away of the inner and outer shells respectively, constituting the housing member.

Fig. 6 is a perspective view of the spring tension plate.

Fig. 7 is a perspective view of the cam disk.

Fig. 8 is a perspective view of the split spring ring which serves to lock the stud member in cammed relation within the socket member.

Referring to the drawing, I have shown an embodiment of the fastening device of my invention as applied to securing together two plates 10 and 11 in juxtaposed relation. Plate 10 may be part of a body member in the construction of an aeroplane, for example, the nacelle for a motor thereof, and the plate 11 may be a cover plate or cowling for such motor.

The fastening device comprises two cooperating members, namely, a socket member 12 carried by the plate 10 and a headed stud member 13 which may be conveniently carried by the plate 11.

Preferably the socket member 12 comprises a housing formed of an inner shell member 14 and an outer shell member 15 suitably connected in telescopic relation in a manner to be presently explained. The inner shell member 14 is of general tubular form and comprises a body portion and a reduced neck portion connected together by a shoulder 16, the neck portion having an external annular groove 17. The body portion of the shell is formed with an inwardly directed radial rib 18 for cooperation with complemental recesses 19 on a spring plate or washer 20 and with a recess 21 on a cam plate 22 for holding said spring plate and cam plate in non-rotative relation with respect to the shell. The spring plate 20 is in the form of a flat annular ring having diametrically opposed raised arcuate portions 23. It will be understood, however, that resiliency may be imparted to the plate 20 by giving to it any other configuration. The cam plate 22 is formed with a central opening 24 which is traversed by a diametrical slot 25. Flanking the slot 25 are a pair of diametrically opposed inclined or cam surfaces 26 which, at their high points, are flanked by abutments 27.

The outer shell member 15 is also of general tubular form and has a body portion 28, a reduced neck portion 29 and an inwardly dished cap portion 30. The body portion is formed with an inwardly directed radial rib 31 and formed in the neck portion 29 is a recess or opening 32 adapted to receive the re-entrant portion or rib 33 formed on a split spring 34, which lattter is adapted to engage about the reduced neck portion 29, for a purpose which will presently be made apparent.

The socket member 12 includes the various parts hereinbefore described bearing reference characters from 14 to 34 and is assembled into a unit by first positioning the spring plate 20 within the inner shell member to rest on the shoulder 16 with the recess 19 of the spring plate engaging the rib 18 of the shell. The cam plate 22 is then disposed over the spring plate with the recess 21 of the cam plate engaging the rib 18 and with the cam surfaces directed outwardly of or away from the spring plate. To hold the spring plate and the cam plate in the assembled relation above described, the outer shell is mounted in telescopic relation over the inner shell containing a spring plate and cam plate with the rib 31 of the outer shell engaging the recess formed in the outer surface of the inner shell 14 by the rib 18 and the free end of the body portion 28 is then spun over the shoulder 16 on the inner shell member. The spring 34 is then mounted over the neck of the outer shell with the re-entrant portion 33 extending into the opening 32. The relationship between the opening in the neck portion 29 and the abutments 27 on the cam plate must be fixed, hence a definite relationship exists between the locations of the recess 32 and rib 31 on the outer member and the rib 18 on the inner shell member, which latter definitely positions the abutments within said inner shell.

The socket member 12 may be secured to the plate 10 in any desired manner but I prefer to make such attachment readily disengageable, and to accomplish this I make use of a split spring securing ring 35 which is adapted to be snapped into the external annular groove 17 after the portion of the socket member carrying said groove is inserted through the flared opening 36 in the plate 10.

The stud member 13 which is adapted for cooperative engagement with the socket member for holding the plates 10 and 11 in juxtaposed position is provided with a cross-pin 37 adjacent the unheaded end of the stud. The distance between the cross-pin 37 and the outer surface of the head of the stud is such that when the stud is inserted into the socket member and rotated therein the cross-pin will ride upon the cam surfaces 26 against the tension of the spring plate 20 until the cross-pin reaches the crown points of the cam plate, in which position the head of the stud should preferably lie flush with the cover plate 11. To provide for such flush relationship the metal of the cover plate surrounding the opening therein is preferably flared inwardly as shown at 38. Where the cover plate is to be used in aeroplane construction it will be understood that lightness is of primary importance and hence such cover plates are usually made of aluminum or an aluminum alloy. However, since aluminum and its alloys are relatively soft and subject to wear under conditions of friction and vibration with other parts, the metal surrounding the flared opening of the cover plate is preferably protected with a steel grommet such as 39.

In clamping and locking the cover plate 11 against the plate 10, the stud member 13 is inserted through the open end of the socket member 12 so that the cross-pin 37 will pass through the slot 25, whereupon, by rotating the stud in a clockwise direction with the aid of a screwdriver or other suitable tool the cross-pin will be caused to ride upon the cam surfaces 26 against the tension of the spring member 20. When the cross-pin approaches the high points on the cam plate 22 one end of the pin will engage the re-entrant portion 33 of the spring 34 to tension and move it radially outward, and continued rotation of the stud will bring the ends of the cross-pin against the abutments 27 thereby clearing the re-entrant portion 33 of the spring 34 and permitting said re-entrant portion to snap back into position behind one end of the cross-pin, thereby locking said cross-pin on the high points of the cam against accidental disengagement under most severe conditions of stress and vibration. Obviously, if desired, the socket member may be formed with two openings 32 at diametrically opposite points and the spring 34 may be formed with two correspondingly located detents 33 for cooperation with both ends of the cross-pin 37. When it is desired to separate or detach the cover plate from the plate 10 the cross-pin may be disengaged from its holding relationship with the re-entrant portion of the spring 34 by applying a sufficient turning force to the stud in a counterclockwise direction to overcome the radial tension of the re-entrant portion of the spring.

It will be observed that when the stud is in locking engagement with the socket member that the stud member is substantially completely enclosed and hence provides no projecting part or obstruction which may give rise to injury to the connection or be otherwise objectionable. It will also be observed that the stud is of a length such that the unheaded end thereof will thus project through the opening in the dished cap 30, the size of said opening being such as to provide an added bearing for the stud.

From the foregoing detailed description it will be apparent that I have provided a novel and compact form of fastening device wherein component parts when in locking engagement are securely held against accidental separation. Also that I have provided a device of the character described which greatly facilitates the connection of the stud member to its supporting member, and one wherein replacements or repairs can be readily made without recourse to time-consuming and costly operations. It will also be apparent that the present embodiment of my invention is merely made by way of example and that changes in the constructional details thereof may be resorted to within the range of engineering skill without departing from the spirit of my invention as defined in the appended claims.

What I claim is:

1. A fastening device comprising in combination, a housing, a plate member in the housing having a slotted opening therethrough, a headed stud member insertable into the housing and through the slotted opening in the plate member and rotatable relatively thereto, one of said members having camming means for acting on the other member as the stud member is rotated, resilient means biasing the plate in an axial direction and normally opposing but permitting such camming action upon the application of a turning force to the stud member and means carried by the housing for holding such cammed members in fully cammed relation against accidental separation.

2. A fastening device according to claim 1 wherein the plate member is formed with a cam surface and the stud member has a lateral projection adapted to ride upon said cam surface.

3. A fastening device according to claim 1 wherein the plate member is formed with a cam surface and is non-rotatably held within the housing.

4. A fastening device according to claim 1 wherein the means carried by the housing for holding the cammed members in fully cammed relation coacts with the stud member.

5. A fastening device according to claim 1 wherein the means carried by the housing for holding the cammed members in fully cammed relation is a spring device acting radially with relation to the stud member when the latter has been inserted in the housing and has had a turning force applied thereto.

6. A fastening device according to claim 1 wherein the plate member is formed with a cam surface having an abutment adjacent the high point on said cam surface, the stud member has a cross-pin adapted to ride upon the cam surface and the means for holding the cross-pin on the high point of the cam surface is a spring device overlying the high point on the cam surface rearwardly of the abutment and against which abutment the spring device is adapted to hold the cross-pin against accidental displacement.

7. A fastening device comprising in combination, a housing, a disk having a slotted opening therethrough and formed with diametrically opposed cam surfaces flanking said slotted opening and with abutments at the high points on said cam surfaces, cooperating means on said disc and on said housing for holding said disk against rotation within said housing, a spring within said housing adapted to apply axial tension on the disk, a radially acting spring device within the housing in overlying relation to the high points on the cam surfaces and rearwardly of the abutments, a headed stud having a cross-pin adjacent its unheaded end insertable through the slotted opening in the disk and rotatable therein to cause the cross-pin to ride upon the cam surfaces and depress the radially acting spring device to permit said cross-pin to pass to engage the abutments, whereupon the spring device will return to normal position to hold said cross-pin against accidental movement from the high points of the cam.

8. A fastening device according to claim 7 wherein the spring device for engaging and holding the cross pin against accidental movement is a split spring ring having a radial re-entrant section.

9. A fastening device according to claim 7 wherein the spring device for engaging and holding the cross-pin against accidental movement is a split spring ring having a radial re-entrant section, said split ring being formed from a flat metal band which is mounted on the exterior of the housing which latter is formed with an opening through which the re-entrant section of the spring projects.

10. A fastening device according to claim 7 wherein the housing is formed of an inner shell which houses the cam disk and the tensioning spring therefor and an outer shell which supports the spring device for holding the cross-pin against accidental displacement, the two shells being telescopically connected together.

11. A fastening device according to claim 7 wherein the housing is formed of an inner and an outer shell telescopically connected together and wherein the cam disk and its tensioning spring are non-rotatably mounted within the inner shell, the spring device for holding the cross-pin against accidental displacement is carried by the outer shell and wherein both shells are connected together in fixed relation to provide the definite relationship between the spring device and the abutments on the cam disk.

12. A fastening device according to claim 7 wherein the housing is formed as a separate unit and is removably mounted upon a supporting member.

13. A fastening device according to claim 7 wherein the housing is formed as a separate unit and is removably mounted upon a supporting member having an opening through which a tubular portion of the housing extends, said tubular portion having an external annular groove into which a split spring ring of larger diameter than the opening in the supporting member is adapted to be snapped.

14. A fastening device according to claim 7 wherein the housing at its outer end is dished inwardly and has a central opening adapted to receive the unheaded end of the stud.

OTTO J. HUELSTER.